United States Patent [19]

Flimon

[11] 4,185,665
[45] Jan. 29, 1980

[54] APPARATUS FOR THE PROTECTION OF TUBES PARTICULARLY TUBES FOR DRILLING PETROLEUM

[76] Inventor: Hughes J. Flimon, 10 Rue Jolly, 94160 St. Mandé, France

[21] Appl. No.: 859,737

[22] Filed: Dec. 12, 1977

[30] Foreign Application Priority Data

May 20, 1977 [FR] France ................. 77 15488
Dec. 1, 1977 [FR] France ................. 77 36222

[51] Int. Cl.² ........................................ F16I 55/10
[52] U.S. Cl. ........................... 138/89; 138/96 T
[58] Field of Search ............... 138/89, 96 R, 96 T; 215/316

[56] References Cited

U.S. PATENT DOCUMENTS

| | | | |
|---|---|---|---|
| 1,165,427 | 12/1915 | McIlroy | 138/96 T |
| 1,812,794 | 6/1931 | Lally | 138/96 R |
| 1,906,182 | 4/1933 | Riney | 138/96 T |
| 2,022,189 | 11/1935 | Engtrom | 138/96 T |
| 2,073,389 | 3/1937 | Engtrom | 138/96 T |
| 2,134,730 | 11/1938 | Osborn | 138/96 T |
| 2,161,197 | 6/1939 | Protin | 138/96 T |
| 2,745,438 | 5/1956 | Bloom | 138/96 T |
| 2,977,993 | 4/1961 | Scherer | 138/96 T |
| 2,989,087 | 6/1961 | Higgins | 138/96 T |
| 3,000,402 | 9/1961 | Bowman | 138/96 T |
| 3,610,288 | 10/1971 | Carr | 138/96 R |
| 3,719,984 | 3/1973 | Frishof | 138/96 X |
| 3,744,528 | 7/1973 | Vestal | 138/96 R X |
| 3,814,135 | 6/1974 | Hetzer et al. | 138/96 T X |
| 3,821,969 | 7/1974 | Sinko | 138/96 R X |

FOREIGN PATENT DOCUMENTS

| | | | |
|---|---|---|---|
| 485622 | 8/1952 | Canada | 138/96 R |
| 1327178 | 4/1963 | France | 138/96 T |

*Primary Examiner*—Richard E. Aegerter
*Assistant Examiner*—James E. Bryant, III
*Attorney, Agent, or Firm*—Stevens, Davis, Miller & Mosher

[57] ABSTRACT

A sealing cover is provided for preventing ingress of water and other foreign matter between the interengaging screw-threads of a stored drilling rig casing pipe element which is fitted either internally or externally with a screw-threaded nipple which engages with the screw-thread on the pipe element and projects beyond the end of the pipe element to protect the screw-thread of the pipe element from damage by impact.

The sealing cover comprises an annular collar which provides an abutment for the outer end of the nipple, a cylindrical sleeve portion having first and second ends which are respectively formed integral with the collar and capable of sealing engagement with the pipe element or the nipple so as to enclose the outer end of the pipe element, a circular portion for insertion into the pipe element and the nipple, and a tubular portion which extends between the collar and the periphery of the circular portion and is frictionally engageable with the inner member of the pipe element and the nipple, to seal the junction between the outer end of the pipe and the nipple.

The first end of the cylindrical sleeve portion of the sealing cover is preferably detachably connected to the remainder of the sealing cover and is provided with two axially extending, circumferential grooves the inner of which provides the second part of the cylindrical sleeve portion with radial resilience and the outer of which is formed for deformable locking engagement with the free end of the remainder of the cylindrical sleeve portion.

11 Claims, 6 Drawing Figures

APPARATUS FOR THE PROTECTION OF TUBES PARTICULARLY TUBES FOR DRILLING PETROLEUM

BACKGROUND OF THE INVENTION

The invention relates to a sealing cover for preventing ingress of fluid between interengaging screw-threads of coaxially disposed inner and outer tubular members one of which is a pipe element which has a screw-threaded portion extending from one end and the other of which is a screw-threaded nipple which is in screw-threaded engagement with said screw-threaded end portion of the pipe element and has a first end which projects axially beyond said one end of the pipe element to protect the screw-thread on the end portion of the pipe element from damage by impact. In particular, although not exclusively, the invention is concerned with sealing covers for protecting the screw-threads formed on pipes such as the casing pipes of oil drilling rigs.

Such pipes with screw-threaded frusto-conical ends are at present delivered from manufacturers with the following end protection; one of the ends is fitted with a first internally screw-threaded, frusto-conical metal nipple and the other end is fitted with a metal coupling socket which is internally screw-threaded at both ends, one end receiving the screw-thread at the other end of the pipe and the other end of the coupling socket receiving a second, externally screw-threaded metal nipple so that the screw-threads at the opposite ends of the pipe and at the other end of the coupling socket are protected from damage by impact by the first nipple, by said one end of the coupling socket, and by the second nipple, respectively.

The disadvantage of this method of protection is that it is purely mechanical and is, in practice, ineffective against certain environmental conditions, since to make their insertion more convenient, the nipples and the coupling socket each have relieved ends which leave part of the screw-threads uncovered; in any case, of course, they do not comprise any device aimed at insulating the screw-threaded frusto-conical portions of the pipe and the coupling socket from environmental influences.

However, the casing pipes are usually used on offshore platforms or on continental desert sites and in a majority of cases are attacked by salty atmosphere, solar heat, winds and abrasive sands, and these climatic agents sometimes attack pipes together on the same site.

The metal nipples and coupling sockets at present used allow the penetration of sand, various dusts, air and rain which enter the pipes and coupling sockets and stagnate, attacking the screw-threads and neutralizing the grease applied when the casing pipe was finished and assembled with the coupling socket at the factory.

At many pipe storage locations, users have found that screw-threads were heavily damaged for the foregoing reasons, involving very high costs, because after a certain time in certain countries, the screw-threads rust and snap off, so that users are obliged to inspect their stores of pipes periodically, and this calls for considerable amounts of difficult handling (unscrewing the protective metal nipples and replacing them after greasing).

Clearly, in view of the working conditions unavoidably caused by the site where the pipes are kept, this is a serious problem and the known protection method has serious disadvantages.

Thus, as disclosed in U.S. Pat. Nos. 1,837,345; 2,134,730; 2,873,765 and 4,020,873, various solutions have been attempted to provide sealing covers which will protect the screw-threads of pipe elements. However, none of these solutions has provided adequate protection of the screw-threads against damage by impact and damage resulting from the ingress of fluid.

SUMMARY OF THE INVENTION

It is therefore an object of the present invention to provide a simple, economic method of enabling the assembly formed by a screw-threaded pipe element, such as a pipe or coupling socket, and a nipple to be given extra protection against attack from the environment, the protection following three criteria:

the sealing cover is retained in position on the nipple of the casing pipe;

the outer edge of the nipple is hermetically sealed; and the sealing cover is given some radial resilience, inter alia with a view to stacking the casing pipes horizontally.

According to the invention, there is provided a sealing cover, for preventing ingress of fluid between interengaging screw-threads of coaxially disposed inner and outer tubular members one of which is a pipe element which has a screw-threaded portion extending from one end and the other of which is a screw-threaded nipple which is in screw-threaded engagement with said screw-threaded end portion of the pipe element and has a first end which projects axially beyond said one end of the pipe element to protect the screw-thread on the end portion of the pipe element from damage by impact, comprising a closure portion for closing the screw-threaded nipple; and a cylindrical sleeve portion having first and second ends which are respectively formed integral with the closure portion and capable of sealing engagement with the outer surface of the inner or outer tubular member so that the sealing cover encloses said one end of the pipe element.

In one embodiment, the sealing cover is formed in the shape of a cup in which the cylindrical sleeve portion or skirt is integrally formed with a closure portion corresponding to the base of the cup and, in a preferred construction the closure portion is inwardly dished so as to comprise a circular portion for insertion into the inner tubular member, a tubular portion which extends from the periphery of the circular member and is frictionally engageable with the inner surface of the inner tubular member to form a seal between the closure portion and the inner tubular member, and an annular portion in the form of a collar which fits over and engages intimately with the free edge of the nipple and has inner and outer edges respectively integral with the first end of the cylindrical sleeve portion and with the tubular portion of the closure portion. The skirt is thus able to be clamped against the outer surface of one of the inner and outer tubular members.

In a preferred embodiment, the skirt provided by the first end of the cylindrical sleeve portion of the sealing cover terminates at a free end in an externally profiled annular extension and a detachably connected second end of the cylindrical sleeve portion of the sealing cover takes the form of a rim having three substantially coaxial, annular-section lips one of which is clamped against the outside surface of the inner tubular member, the three lips defining inner and outer annular-section, coaxially extending recesses which open in the direction of the first end of the cylindrical sleeve portion and the outer recess receives the annular extension of the second end of the cylindrical sleeve portion and has a profile complementary with the profile of the extension with which it co-operates by resilient engagement. This arrangement immediately reveals certain advantages of the sealing cover according to the invention:

closing the casing pipe at its free end by inserting a re-entrant portion of the sealing cover;

hermetically protecting the screw-threads at the outer edge of the nipple by the close association of the lips of the second end of the cylindrical sleeve portion of the sealing cover with firstly the profiled end of the extension of the first end of the cylindrical sleeve portion and secondly the outside surfaces of the tubular members;

enabling the pipes to be manipulated by hooks, due to the re-entrant shape of the dished base of the sealing cover;

retaining the second end of the cylindrical sleeve portion on the tubular members by co-operation of the second end of the cylindrical sleeve portion abutting the inner edge of the outer tubular member;

transverse resilience due to a radial space formed by the inner recess in the second end of the cylindrical sleeve portion so as to prevent the sealing cover from being crushed when the pipes are stacked horizontally.

DESCRIPTION OF THE DRAWINGS

Embodiments of the invention are hereinafter described, by way of example, with reference to the accompanying drawings, in which.

DESCRIPTION OF PREFERRED EMBODIMENTS

As already pointed out, the casing pipe and its metal nipple have been omitted from FIGS. 2 and 3, which illustrate the preferred embodiment of the invention; this is why reference will first be made to FIG. 1 to show the general shape of a casing pipe surmounted by its nipple and to illustrate the way in which this assembly co-operates with a sealing cover according to the invention.

Figure 1:
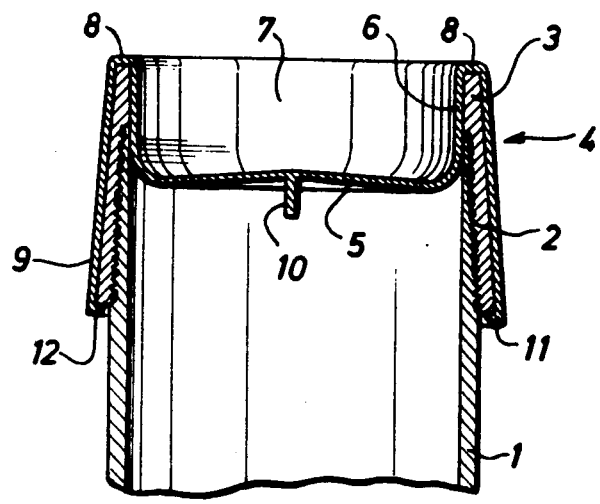
FIG. 1 is a sectional view of one of the screw-threaded ends of a casing pipe having a protective nipple and surmounted by a simplified variant of the sealing cover according to the invention.

FIG. 1 shows a casing pipe 1 whose frusto-conical screw-threaded end 2 is surmounted by a screwed-on metal nipple 3 having a simplified version of the sealing cover 4.

The sealing cover 4 is of one-part construction and comprises a circular portion 5 and a tubular portion 6 defining a dish 7, an annular portion in the form of a rounded collar 8 and a cylindrical sleeve portion in the form of an outside skirt 9 which is clamped onto the surface of the nipple 3. The circular portion 5 has a lug 10 for hooking on a sachet containing, for instance, dehydrating or anti-corrosion agents.

In this simplified variant, the skirt 9 comprises at the inner end of the nipple 3—the ends remote from the opening of the pipe 1—an inwardly directed flange 11 which bears against the inner edge 12 of the nipple 3. In the embodiment illustrated, the flange 11 has a trapezoidal section, but clearly it can have any other shape, such as rounded or triangular; similarly, its transverse length may vary, and inter alia may be such that it terminates in the immediate vicinity of the screw-threaded interior surface of the nipple.

The method of protection ensured by the sealing cover 4 taken separately can clearly be gathered from the drawings; fitted into the free end of the nipple 3, the dish 7 hermetically seals the opening of the pipe 1, the tubular portion 6 being closely applied against the inner surfaces of the nipple 3 and the pipe 1. The skirt 9 and flange 11 ensure that the sealing cover 4 is seated and retained on the nipple 3.

Figure 2:
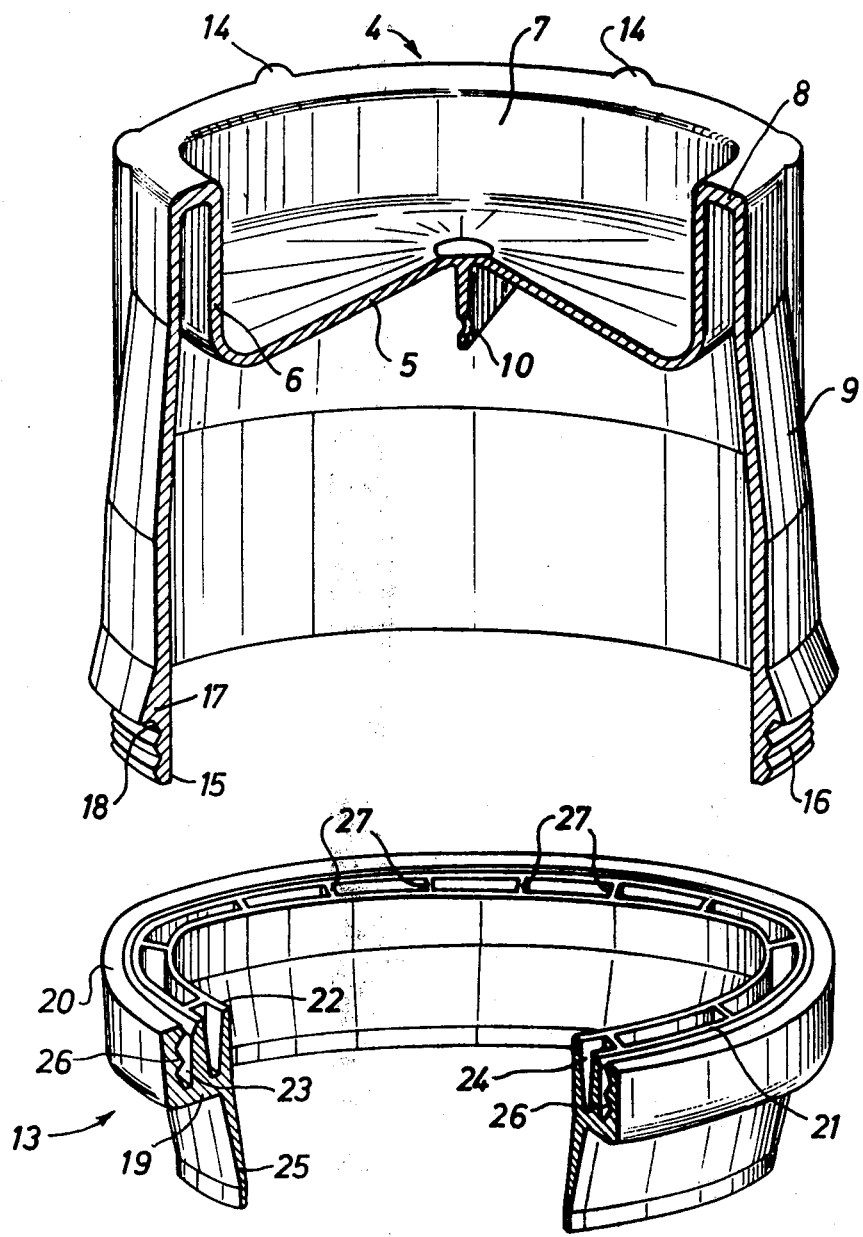
FIG. 2 is a partially broken-away perspective view of a preferred embodiment of the invention, showing its two constituent elements separately; to simplify the drawing, the casing pipe and the protective nipple have been omitted.
Figure 3:
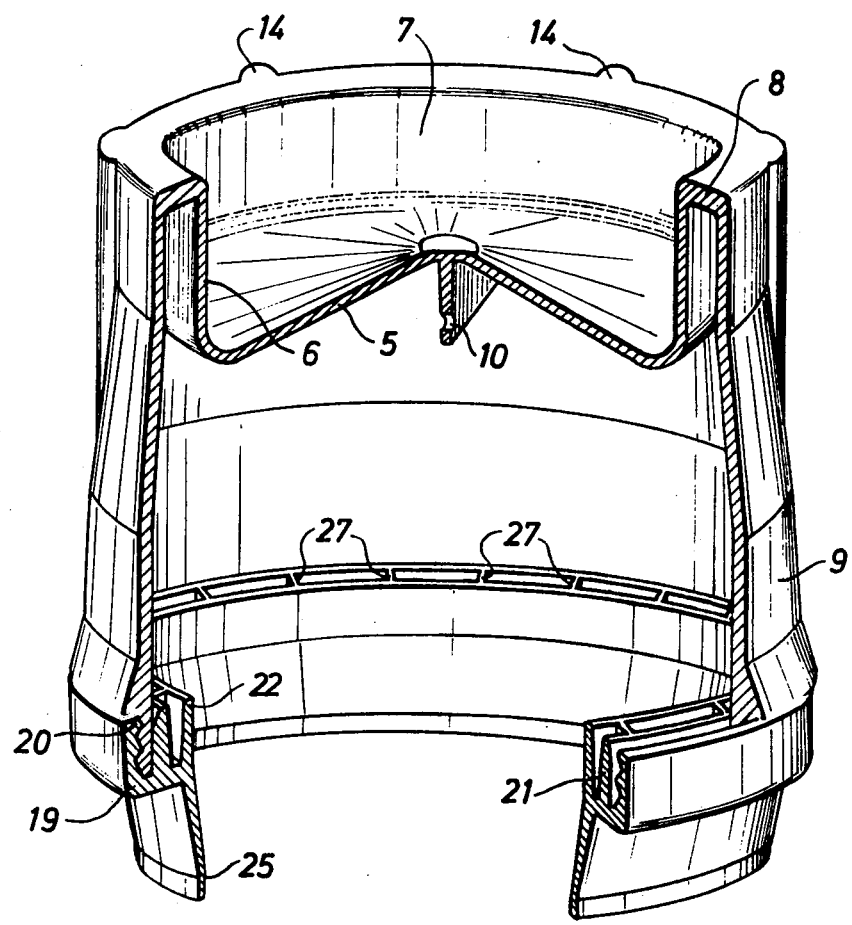
FIG. 3 is a view similar to FIG. 1, but shows the two elements of the sealing cover according to the invention joined to one another.

Reference will now be made to FIGS. 2 and 3 which show the sealing cover in a form provided with a detachable ring 13, the preferred embodiment of the protective device according to the invention. Apart from its portions disclosed hereinbefore, the skirt 9 has a series of external ribs 14 which start from the collar 8 and extend downwards to merge flush with the outer surface of the skirt. The ribs act as means to be gripped manually or if necessary by a tool to mount, but more particularly to demount, a complete assembly formed by the nipple and sealing cover. It should be emphasized that the collar 8 has a greater thickness than the tubular portion 6 and skirt or cylindrical sleeve portion 9 which it interconnects.

At its free end, the skirt 9 has an annular-section terminal section 15 having an outer surface which is formed with a series of circumferential ribs defining a toothed profile 16. Where the profiled extension 15 starts, the skirt 9 has a slight radial extra thickness 17 which is oriented outwardly and forms a shoulder 18 whose function is defined hereinafter.

The ring 13 is formed by a rim 19 from which inner, central and outer substantially coaxial, annular-section lips 20, 21 and 22 which define annular-section axially extending recesses 23 and 24. The inner lip 22 has an oppositely extending prolongation 25 which is of slightly tapering outline in the embodiment illustrated. The inner lip 22 and its prolongation 25 are clamped onto the outer surface of the casing pipe, where they produce a hermetic joint. The outer surface of the lip 20 has a toothed profile 26 complementary with the toothed profile 16 of the end of the skirt 9. Moulded between the lips 21 and 22 are a series of stiffening struts 27 merging flush with the upper part of the recess 24.

FIG. 3 shows clearly how the first end of the skirt or cylindrical sleeve portion 9 and the ring 13 co-operate. When the sealing cover 4 has been fitted via its dish 7 onto the assembly formed by the pipe 1 and its surmounting nipple 3 and the ring 13 has been slipped onto the casing pipe, the ring 13 is pushed, either manually, hydraulically or mechanically, towards the first end of the cylindrical sleeve portion provided by the skirt 9 so that the profiled extension 15 fits into the recess 23 by the resilient engagement of the two toothed profiles 16 and 26. At the same time, the edge of the lip 20 comes into abutment with the shoulder 18, while the surface defined by the edges of the lips 21 and 22 and the struts 27 abuts the facing edge of the nipple 3.

As can be seen in FIG. 3, successive hermetic joints are produced between the first end of the cylindrical sleeve portion of the sealing cover 4 and the ring 13 in addition, as already pointed out, to the clamping of the inner lip 22 and its prolongation 25 onto the pipe. The recess 24 performs two functions; on the one hand, by straining slightly on the pipe it guarantees close contact between the annular extension 15 and the recess 23 of the ring producing the outer joint, and on the other hand, if the pipes are stacked horizontally the recess 24 acts as a resilient shock-absorbing element which prevents the outer joint from being crushed and deformed.

Of course, this embodiment of the invention can be varied in many ways, for example, the profile of resilient co-operation between the ring and the first end of the cylindrical sleeve portion of the sealing cover may be changed. Clearly, all such variants form an integral part of the invention.

Figure 4:
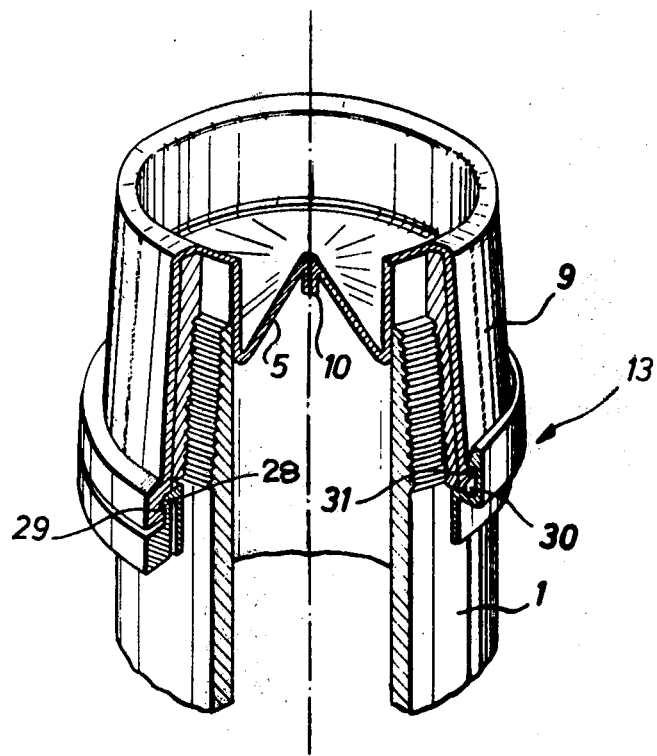
FIG. 4 is a partly broken-away perspective view of two further variants of sealing covers according to the invention which are shown, respectively, on the left-hand and right-hand halves of the figure.

FIG. 4 shows two variants of the method of co-operation between the profile of the first end of the cylindrical sleeve portion of the sealing cover 4 and the retaining ring 13; each of the halves of FIG. 4 illustrates a different method. In both cases the co-operation, which contributes towards the temporary connection of the ring 13 to the skirt 9, is obtained by a profiled extension of one of the elements which engages by resilient deformation in a recess of suitable profile in the other element. As shown in the left-hand part of FIG. 4, the ring 13 bears an annular profiled extension 28 which engages in a groove 29 in the skirt 9, the latter surrounding the ring 13. The converse conditions are shown in the right-hand half, where the ring 13, outside the skirt, bears a recess 30 receiving extension 31 of the skirt 9.

Figure 5:
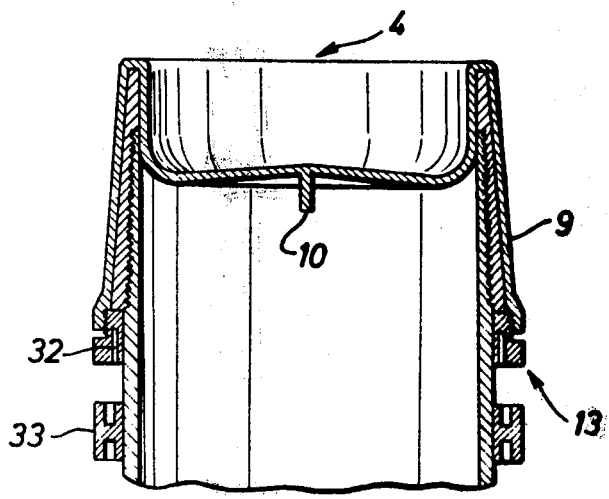
FIG. 5 is a sectional view of another variant of the sealing cover according to the invention with an extra spacing ring.

In the variant illustrated in FIG. 5, the ring 13 and the first end of the cylindrical sleeve portion 9 are in screw-threaded engagement; the recess 32 gives the ring 13 the transverse resilience whose advantage has hereinbefore defined. It is an aim of the additional ring 33 in FIG. 5 to complete this protection by acting as a spacing element when the pipes are stacked horizontally. The additional ring 33 can remain isolated or be adapted for temporary connection to the ring 13.

It should also be pointed out that in the variants illustrated in FIGS. 2 and 3 on the one hand and in FIGS. 4 and 5 on the other, sealing at the inner joint between the pipe 1 and the nipple 3 can be completed by the addition of a fitting in the form of a flat or toroidal washer, and the second end of the cylindrical sleeve portion and the ring can have complementary recesses to receive the washer.

Figure 6:
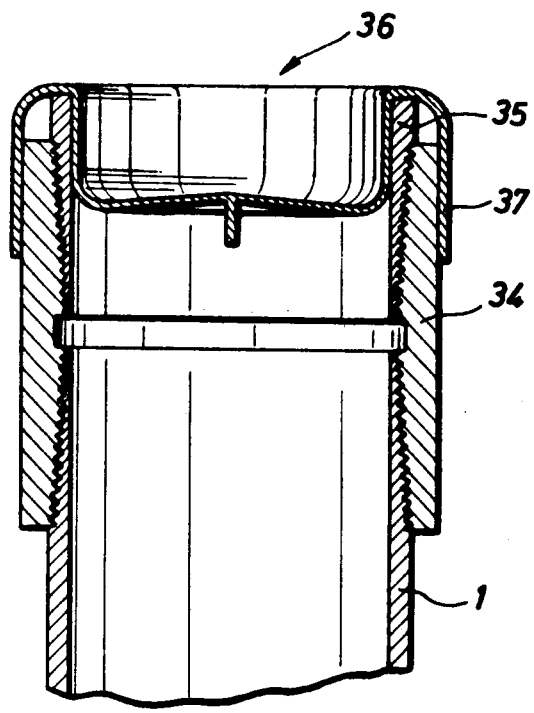
FIG. 6 is a sectional view of an embodiment of the sealing cover according to the invention applied to a coupling socket for connecting two casing pipes.

FIG. 6 shows a coupling socket 34 in position on the second end of the pipe 1; the internal screw-thread of the socket 34 is protected by a nipple 35 screwed into the open end of the coupling socket, a sealing cover 36 according to the invention fitting over the nipple 35 and socket 34; in this case the sealing cover 36 has a straight skirt 37 clamped onto the outside surface of the coupling socket. A seal is provided by the sealing cover according to the invention at the most critical point—i.e., at the nipple 35 protecting the screw-thread by which the two casing pipes are assembled.

As regards the method of manufacture of the protective device according to the invention, preferably the sealing cover 4 is produced by moulding from plastics of the copolymer or homopolymer family; these different materials can be mixed with one another and/or with an elastomer, in dependence on the required characteristics of behaviour.

The ring 13 is generally moulded from the same material as the remainder of the sealing cover, while in view of its function, the ring 33 illustrated in FIG. 5 must, in certain cases, be of metal or of metal coated with plastics or rubber.

Only a few of the many possible embodiments of the sealing cover according to the invention have been mentioned and disclosed herein; clearly, the list is in no way limitative and all combinations of the elements disclosed and their variants form an integral part of the invention.

I claim:

1. A sealing cover, for preventing ingress of fluid between interengaging screw-threads of coaxially disposed inner and outer tubular members one of which is a pipe element which has a screw-threaded portion extending from one end and the other of which is a screw-threaded nipple which is in screw-threaded engagement with said screw-threaded end portion of the pipe element and has a first end which projects axially beyond said one end of the pipe element to protect the screw-thread on the end portion of the pipe element from damage by impact, comprising:

a closure portion for closing the screw-threaded nipple; and a cylindrical sleeve portion capable of providing a sealing engagement with the outer surface of the inner or outer tubular member, said cylindrical sleeve portion having a first part formed integrally with said closure portion and a second part detachably connected with said first part;

said first part of said cylindrical sleeve portion having an externally profiled, annular, resilient extension remote from said closure portion;

said second part of said cylindrical sleeve portion having an annular inner resilient lip, an annular central resilient lip surrounding said inner lip, and an annular outer resilient lip surrounding said central lip; said inner, central and outer lips being coaxial and defining inner and outer annular coaxial recesses having openings facing toward the extension of the first part of said cylindrical sleeve portion, said inner lip being capable of forming a sealing engagement with the outer surface of the inner tubular member;

said outer recess having a profile which is complementary to the profile of the extension of the first part of the cylindrical sleeve portion; and, a plurality of equiangularly disposed radial stiffening ribs extending between the inner and the central lips along axes which are parallel to the central axis of said cylindrical sleeve portion.

2. A sealing cover, for preventing ingress of fluid to a pipe element which has a screw-threading portion extending from one end thereof comprising:

a closure portion for closing the screw-threaded end; and a cylindrical sleeve portion capable of providing a sealing engagement with the outer surface of a tubular element, said cylindrical sleeve portion having a first part formed integrally with the closure portion and a second part detachably connected with said first part;

said first part of said cylindrical sleeve portion having an externally profiled, annular, resilient extension remote from said closure portion;

said second part of said cylindrical sleeve portion having an inner annular resilient lip and at least an outer annular resilient lip surrounding said inner lip and coaxial with said inner lip, said inner and outer resilient lips defining an axially extending annular recess opening extending towards said first part of said cylindrical sleeve portion;

said inner lip being capable of providing a sealing engagement with the outer surface of a tubular member; and, said recess having a profile which is complementary to the profile of the extension of the first part of the cylindrical sleeve portion.

3. A sealing cover, according to claim 2, further comprising a plurality of axially extending ribs provided on the external surface of said first part of the cylindrical sleeve portion to serve as gripping means.

4. A sealing cover, according to claim 2, further comprising a circumferential groove and a co-operable circumferential rib formed in the recess on the second part of the cylindrical sleeve portion and on the extension of the first part of the cylindrical sleeve portion.

5. A sealing cover, according to claim 2, in which the second part of the cylindrical sleeve portion and the extension of the first part of the cylindrical sleeve portion are respectively formed with facing surfaces for abutment with each other.

6. A sealing cover, according to claim 2, further comprising a plurality of equiangularly disposed radial stiffening ribs provided on the exterior side of said inner lip along axes which are parallel to the central axis of said cylindrical sleeve.

7. A sealing cover, according to claim 2, in which the inner lip is provided for axial abutment with the end of the outer tubular member remote from said closure portion.

8. A sealing cover, according to claim 2, in which the inner lip has an annular-section extension which is directed away from the remainder of the cylindrical sleeve portion to form additional sealing means engageable with the outer surface of the inner tubular member.

9. A sealing cover, according to claim 8, in which the annular-section extension is frusto-conical in shape, tapering inwardly as it extends away from the remainder of the inner lip.

10. A sealing cover, according to claim 2, which is moulded from a plastic material.

11. A sealing cover, according to claim 10, in which the plastic material includes an elastomer.

* * * * *